US011327240B2

(12) United States Patent
Van Baelen

(10) Patent No.: US 11,327,240 B2
(45) Date of Patent: May 10, 2022

(54) FIBER OPTIC CONNECTOR WITH BOOT-INTEGRATED RELEASE AND RELATED ASSEMBLIES

(71) Applicant: COMMSCOPE TECHNOLOGIES LLC, Hickory, NC (US)

(72) Inventor: David Jan Irma Van Baelen, Winksele (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 97 days.

(21) Appl. No.: 16/647,450

(22) PCT Filed: Sep. 14, 2018

(86) PCT No.: PCT/US2018/051139
§ 371 (c)(1),
(2) Date: Mar. 13, 2020

(87) PCT Pub. No.: WO2019/055820
PCT Pub. Date: Mar. 21, 2019

(65) Prior Publication Data
US 2020/0278502 A1    Sep. 3, 2020

Related U.S. Application Data

(60) Provisional application No. 62/559,085, filed on Sep. 15, 2017.

(51) Int. Cl.
*G02B 6/38* (2006.01)
(52) U.S. Cl.
CPC .............. *G02B 6/381* (2013.01); *G02B 6/389* (2013.01); *G02B 6/3887* (2013.01); *G02B 6/3831* (2013.01)

(58) Field of Classification Search
None
See application file for complete search history.

(56) References Cited

U.S. PATENT DOCUMENTS

| 5,011,424 A | 4/1991 | Simmons |
| 5,090,916 A | 2/1992 | Magnier |
| 5,101,463 A | 3/1992 | Cubukciyan et al. |
| 5,211,572 A | 5/1993 | Comstock et al. |
| 5,317,663 A | 5/1994 | Beard et al. |
| 5,579,425 A | 11/1996 | Lampert et al. |

(Continued)

FOREIGN PATENT DOCUMENTS

| CN | 1658441 A | 8/2005 |
| CN | 1770568 A | 5/2006 |

(Continued)

OTHER PUBLICATIONS

International Search Report and Written Opinion of the International Searching Authority for International Patent Application No. PCT/US2018/051139 dated Jan. 9, 2019, 12 pages.

(Continued)

*Primary Examiner* — Jerry Rahll
(74) *Attorney, Agent, or Firm* — Merchant & Gould P.C.

(57) ABSTRACT

Fiber optic connectors, including SC and MPO connectors that include a strain relief boot operably coupled with a release mechanism for releasing the connector from an adapter or other termination device or receptacle. The strain relief boot can be operably coupled to move axially together with the outer housing of the connector.

25 Claims, 14 Drawing Sheets

(56) References Cited

U.S. PATENT DOCUMENTS

| | | |
|---|---|---|
| 5,638,474 A | 6/1997 | Lampert et al. |
| 5,915,056 A | 6/1999 | Bradley et al. |
| 6,250,942 B1 | 6/2001 | Lemke et al. |
| 6,254,418 B1 | 7/2001 | Tharp et al. |
| 6,447,170 B1 | 9/2002 | Takahashi et al. |
| 6,554,489 B2 | 4/2003 | Kent et al. |
| 6,692,289 B2 | 2/2004 | Nemoto |
| 6,776,645 B2 | 8/2004 | Roth et al. |
| 6,863,556 B2 | 3/2005 | Viklund et al. |
| 6,885,560 B2 | 4/2005 | Zaremba |
| 6,994,580 B1 | 2/2006 | Chen |
| 7,001,081 B2 | 2/2006 | Cox et al. |
| 7,037,129 B2 | 5/2006 | Lo et al. |
| 7,052,186 B1 | 5/2006 | Bates |
| 7,101,212 B1 | 9/2006 | Larkin |
| 7,163,414 B2 | 1/2007 | Lo et al. |
| 7,281,938 B1 | 10/2007 | Wu |
| 7,297,013 B2 | 11/2007 | Caveney et al. |
| 7,326,075 B1 | 2/2008 | Armstrong et al. |
| 7,329,137 B2 | 2/2008 | Martin et al. |
| 7,354,292 B1 | 4/2008 | Lloyd et al. |
| 7,413,473 B2 | 8/2008 | Wu |
| 7,425,159 B2 | 9/2008 | Lin |
| 7,445,484 B2 | 11/2008 | Wu |
| 7,465,180 B2 | 12/2008 | Kusuda et al. |
| 7,534,125 B1 | 5/2009 | Schroll |
| 7,534,128 B2 | 5/2009 | Caveney et al. |
| 7,549,888 B1 | 6/2009 | Armstrong et al. |
| 7,588,373 B1 | 9/2009 | Sato et al. |
| 7,594,766 B1 | 9/2009 | Sasser et al. |
| 7,641,398 B2 | 1/2010 | O'Riorden et al. |
| 7,651,361 B2 | 1/2010 | Henry et al. |
| 7,666,023 B2 | 2/2010 | Wu |
| 7,736,171 B2 | 6/2010 | Reed et al. |
| 7,753,710 B2 | 7/2010 | George |
| 7,771,225 B1 | 8/2010 | Wu |
| 8,152,384 B2 | 4/2012 | de Jong et al. |
| 8,152,385 B2 | 4/2012 | de Jong et al. |
| 8,187,018 B2 | 5/2012 | Kosugi |
| 8,221,007 B2 | 7/2012 | Peterhans et al. |
| 8,235,745 B1 | 8/2012 | Armstrong et al. |
| 8,317,532 B2 | 11/2012 | Kosugi |
| 8,382,506 B2 | 2/2013 | Reed et al. |
| 8,465,317 B2 | 6/2013 | Gniadek et al. |
| 8,764,308 B2 | 7/2014 | Irwin et al. |
| 9,557,495 B2 | 1/2017 | Raven et al. |
| 9,570,852 B2 | 2/2017 | Plamondon et al. |
| 10,830,967 B2 | 11/2020 | Pimentel et al. |
| 2004/0247252 A1 | 12/2004 | Ehrenreich et al. |
| 2005/0054230 A1 | 3/2005 | Huang |
| 2005/0124201 A1 | 6/2005 | Lo et al. |
| 2006/0276071 A1 | 12/2006 | Rossi |
| 2007/0049082 A1 | 3/2007 | Wu |
| 2007/0077806 A1 | 4/2007 | Martin et al. |
| 2007/0232118 A1 | 10/2007 | Wu |
| 2008/0226235 A1 | 9/2008 | Luther et al. |
| 2009/0042424 A1 | 2/2009 | Kaneda |
| 2009/0162019 A1 | 6/2009 | Lichoulas et al. |
| 2009/0285534 A1 | 11/2009 | Ishikawa |
| 2010/0216325 A1 | 8/2010 | Huang |
| 2012/0057826 A1 | 3/2012 | Katoh |
| 2012/0269485 A1 | 10/2012 | Haley et al. |
| 2013/0323949 A1 | 12/2013 | De Dios Martin et al. |
| 2014/0038448 A1 | 2/2014 | Crain |
| 2014/0141641 A1 | 5/2014 | De Dios Martin et al. |
| 2016/0116685 A1 | 4/2016 | Wong et al. |
| 2016/0209602 A1 | 7/2016 | Theuerkorn |
| 2016/0356962 A1 | 12/2016 | Moriyama et al. |
| 2017/0031109 A1 | 2/2017 | Meadowcroft et al. |

FOREIGN PATENT DOCUMENTS

| | | |
|---|---|---|
| CN | 101065888 A | 10/2007 |
| CN | 101133524 A | 2/2008 |
| CN | 101160696 A | 4/2008 |
| CN | 101313441 A | 11/2008 |
| CN | 101160696 B | 7/2010 |
| CN | 101313441 B | 2/2011 |
| CN | 1770568 B | 11/2011 |
| CN | 102365568 A | 2/2012 |
| CN | 103091793 A | 5/2013 |
| CN | 102365568 B | 7/2014 |
| CN | 103091793 B | 1/2016 |
| EP | 0 997 756 A2 | 5/2000 |
| EP | 1 653 566 A1 | 5/2006 |
| EP | 1 855 360 A1 | 11/2007 |
| EP | 1 653 566 B1 | 6/2008 |
| EP | 2 063 497 A1 | 5/2009 |
| EP | 2 144 100 A1 | 1/2010 |
| EP | 2 337 163 A1 | 6/2011 |
| EP | 2 144 100 B1 | 3/2012 |
| JP | S63-184271 A | 7/1988 |
| JP | 2003-526116 A | 9/2003 |
| WO | 2004/065999 A2 | 8/2004 |
| WO | 2006/047258 A1 | 5/2006 |
| WO | 2007/044310 A1 | 4/2007 |
| WO | 2009/135787 A1 | 11/2009 |
| WO | 2010/038283 A1 | 4/2010 |
| WO | 2012/054174 A1 | 4/2012 |
| WO | 2012/107439 A1 | 8/2012 |
| WO | 2012/107441 A1 | 8/2012 |
| WO | 2012/151175 A2 | 11/2012 |
| WO | 2013/124785 A1 | 8/2013 |
| WO | 2015/103783 A1 | 7/2015 |
| WO | 2017/046062 A1 | 3/2017 |
| WO | 2019/126337 A1 | 6/2019 |
| WO | 2019/195652 A1 | 10/2019 |

OTHER PUBLICATIONS

Extended European Search Report for European Patent Application No. 18856715.0 dated May 4, 2021, 5 pages.

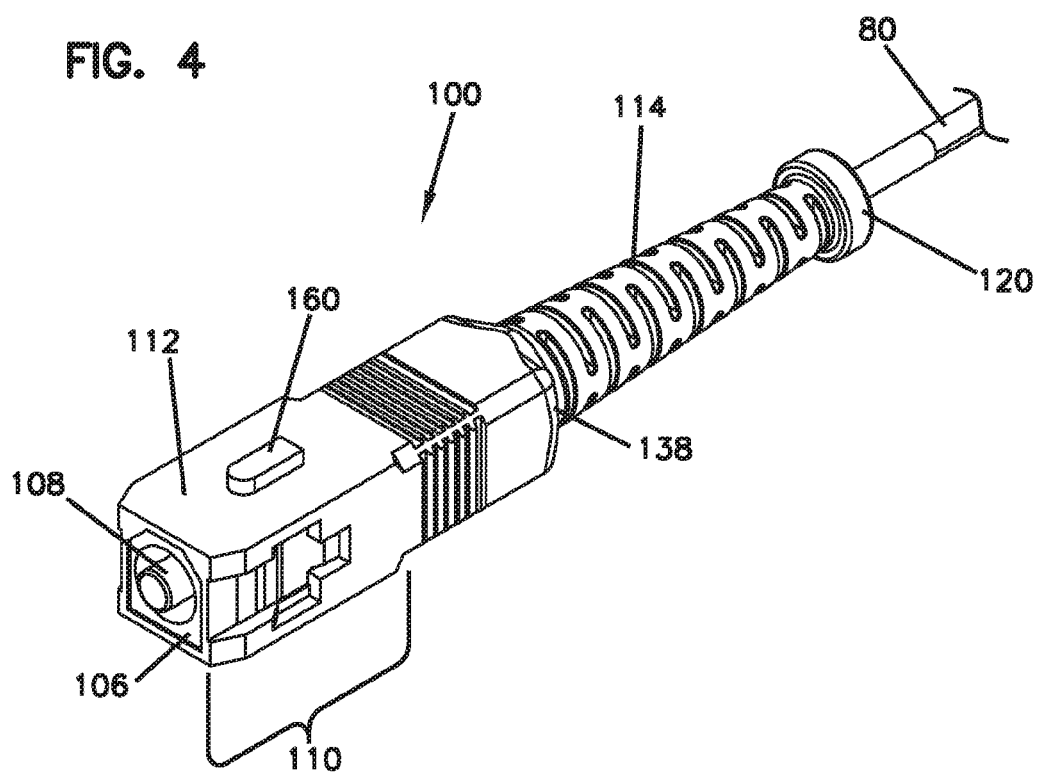
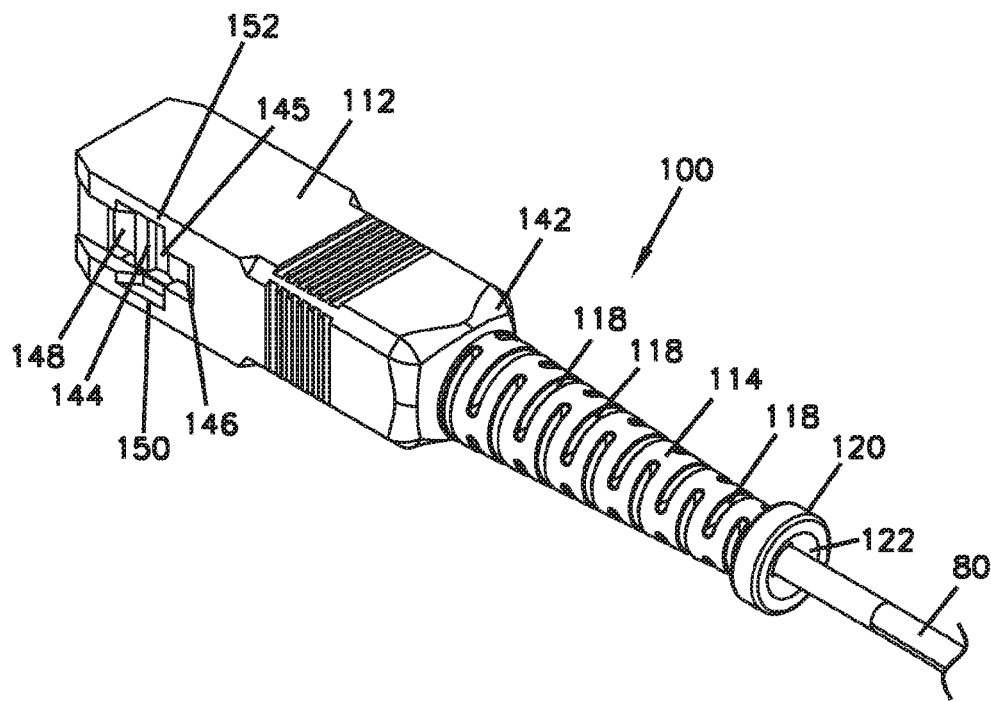

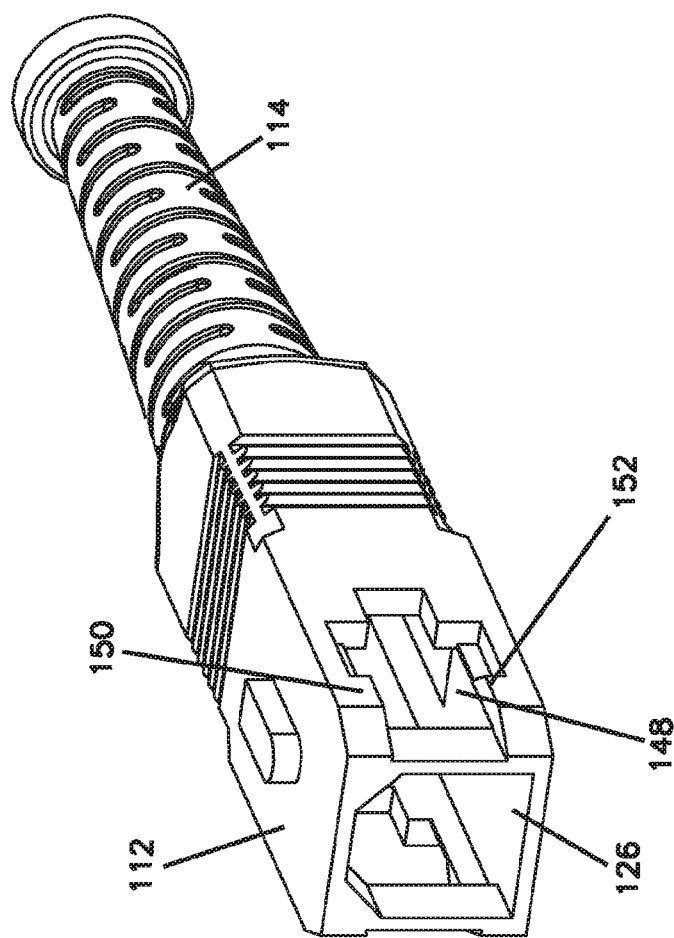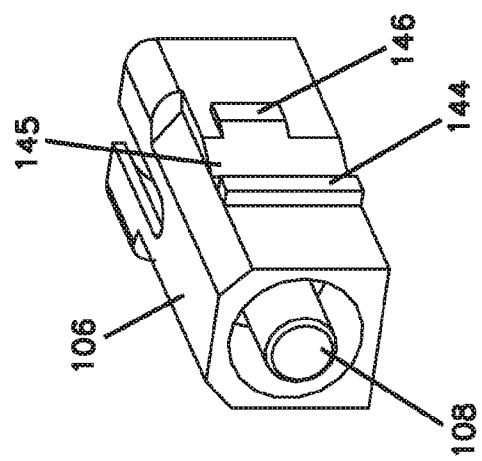
FIG. 9

FIBER OPTIC CONNECTOR WITH BOOT-INTEGRATED RELEASE AND RELATED ASSEMBLIES

CROSS-REFERENCE TO RELATED APPLICATION

This application is a National Stage Application of PCT/US2018/051139, filed on Sep. 14, 2018, which claims the benefit of U.S. Patent Application Ser. No. 62/559,085, filed on Sep. 15, 2017, the disclosures of which incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The optical cables carry optical fibers that transmit optical signals. Networking and distributing the data-transmitting optical fibers typically requires coupling optical fibers to each other, e.g., by connecting one or more "input" fibers to one or more "output" fibers, which route signals to/from one or more destinations, such as homes, businesses, or particular pieces of hardware, such as computers, etc.

Coupling of optical fibers can take place at, e.g., fiber distribution panels such as patch panels, at or within telecommunications closures, or other distribution equipment. Coupling of optical fibers to each other can include one or more of optical splices, optical connectors, and/or optical alignments devices.

Optical connectors are commonly employed to couple optical fibers to one another, particularly when a high density of optical coupling is required in a limited space, e.g., at a patch panel. Different optical connectors can be used depending on the user's specific connectorization needs. For example, optical connectors can be ruggedized for outdoor or extreme environments. In addition, optical connectors can be single fiber connectors or multi-fiber connectors, such as MPO connectors.

Optical connectors can also vary in form factor, which are standardized within the industry by the Telecommunications Industry Association (TIA). Examples of single fiber connectors having different standardized form factors are SC and MPO connectors. The standardization protocol requires, for example, that all SC connectors be compatible/interchangeable with SC adapters and SC termination receptacles, that all MPO connectors be compatible/interchangeable for a given MPO adapter or other MPO termination receptacle, etc.

For example, there is a Fiber Optic Connector Intermateability Standard (FOCIS) for SC connectors (FOCIS 3). FOCIS 3 covers, for example, adapter interface dimensions, adapter sleeve characteristics, adapter mounting characteristics, adapter keying characteristics, connector interface dimensions, ferrule characteristics, etc. FOCIS 5 covers MPO connectors and adapters.

Typical SC connectors include an inner housing and an outer housing that moves relative to the inner housing. The inner housing supports a ferrule that terminates the optical fiber. Pairs of SC connectors are coupled to each other via some sort of adapter which optically aligns and couples the ferrule faces of the two connectors. Typically, the ferrule is spring loaded in its respective connector inner housing to improve coupling and optical transmission at the ferrule face.

The outer housing of a typical SC connector is axially movable relative to the inner housing. Shoulders/catches on either side of the inner housing of the SC connector snap into complementary features of an optical adapter or other compatible termination device. The outer housing includes windows that expose the inner housing shoulders/catches. The outer housing, by axially sliding relative to the inner housing, cooperates with the inner housing to release the connector from the adapter or other termination device/receptacle. A technician can grasp the outer housing and pull back to actuate this release mechanism.

Typically, a rear housing is coupled to the inner housing. A load/bend resisting element, such as a strain relief boot, is then coupled to the rear housing and extends rearward of the connector. Thus, the outer housing moves independently of the rear housing and the boot.

A prior art SC connector and SC adapter are described in U.S. Pat. No. 5,317,663, filed May 20, 1993, which disclosure is incorporated by reference herein in its entirety.

Typical MPO connectors include an inner housing supporting a multi-fiber ferrule and an outer housing moveable relative to the inner housing against an axially biasing spring. Pairs of MPO connectors are coupled to each other via some sort of adapter which optically aligns and couples the ferrule faces of the two connectors. Typically, the ferrule is spring loaded in its respective connector inner housing to improve coupling and optical transmission at the ferrule face.

Latch arms on opposing sides within an MPO adapter socket or other compatible termination device lockingly snap into notches on opposing sides the outer surface of the inner housing. When latched, the inner wall of the outer housing covers the latch arms. By axially sliding the outer housing rearwards (i.e., against the spring bias) relative to the inner housing, the latch arms become uncovered by the outer housing. Further rearward pulling of the outer housing causes the portions of the latch arms that engage the notches to ride up ramps at the front of the notches, such that the latch arms disengage the notches, thereby releasing the MPO connector from the adapter or other termination device/receptacle.

A technician can grasp the outer housing and pull back to actuate this release mechanism. A rear protruding stop on the inner housing can stop the outer housing from being pulled back too far, e.g., from being pulled rearward beyond the inner housing or from damaging the spring that axially biases the outer housing. A strain relief boot can be attached to the rear of the inner housing. Thus, the outer housing is not operably coupled to the strain relief boot and moves independently of the strain relief boot.

There is a need for simplified fiber optic connectors, including, e.g., SC and MPO connectors, having fewer parts and improved release mechanisms.

SUMMARY

In general terms, the present disclosure is directed to fiber optic connectors in which a strain relief boot is integrally movable with a release mechanism of the connector such that, e.g., the release mechanism can be activated simply by pulling on the boot. The release mechanism can include, e.g., the outer housing of a SC connector or the outer housing of a MPO connector.

Advantages of the connectors disclosed herein can be realized, for example, in high density connector termination equipment, such as a distribution or parking panel that includes a large number of densely packed connectors. Due to the features of the connectors of the present disclosure, a technician can release a given connector from termination equipment simply by grasping and pulling its strain relief boot, which is more easily accessed than the connector's outer housing. Moreover, the flexibility of the boots allows for adjacent boots to bend aside without causing optical transmission disturbances while at the same time providing finger space for grasping the boot of the connector to be removed.

The release mechanism features of the present disclosure can be incorporated into standard form connectors, such as standard SC and MPO connectors. Thus, for example, the forward or mating portions of connectors of the present disclosure can match the corresponding connector form factor and be configured to mate with the corresponding standard adapter for that kind of connector.

Features of the disclosed connectors will be described with specific reference to SC and MPO form factor connectors. However, principles and features of the connectors disclosed herein are not limited to these connectors, and can be applied to other connector form factors and non-optical connectors, whether commercially practiced now or in the future.

Connectors in accordance with the present disclosure can be adapted to connectorize single fibers to each other or sets of multiple fibers to each other, e.g., the fibers of one or more ribbonized cables.

Connectors in accordance with the present disclosure can be "splice on" connectors in which one or more fibers are spliced to a fiber stub or stubs pre-installed in the connector inner housing. According to some of these examples, the splice or splices can be housed in a splice volume defined by the connector. Alternatively, the splices can be provided outside the connector.

Connectors in accordance with the present disclosure need not be "splice on." For example, an optical fiber can be terminated and processed in the connector without being spliced.

Connectors in accordance with the present disclosure support one or more ferrules. The ferrules can be spring biased (i.e., axially movable against a spring) or fixed in place relative to a portion of the connector housing. Each ferrule supports the end of at least one optical fiber or optical fiber stub spliced to an optical fiber.

The optical fiber/fiber stub can be coupled to the ferrule in any suitable way. For example, the fiber/stub can be inserted into a pre-formed axial hole of the ferrule and secured therein, e.g., with adhesive. Alternatively, the ferrule can be over-molded directly onto the fiber/stub or otherwise affixed thereto, e.g., with thermally expandable/compressible materials.

Connector housings of the present disclosure can be made integral with their ferrule or ferrules, e.g., the ferrule is molded together with the housing. Alternatively, the ferrule (s) is/are installed in the pre-made connector housing.

The strain relief boots can be made integral with the respective release mechanism of the fiber optic connector. Alternatively, the strain relief boot can be manufactured as a separate component from the fiber optic connector housing and then operably coupled to the release mechanism of the fiber optic connector when assembling the connector such that the boot is movable together with the release mechanism. Thus, in some examples, the fiber stub or optical fiber is terminated in the connector prior to the operable coupling of the strain relief boot and the release mechanism. In other examples, the fiber stub or optical fiber is terminated in the connector following the operable coupling of the strain relief boot and the release mechanism. In either case, the release mechanism can be coupled to the inner housing of the connector before or after the fiber stub or optical fiber is terminated in the connector.

In accordance with aspects of the present disclosure, a fiber optic connector includes an inner housing supporting a ferrule at a front end and having a forward portion adapted to operably mate with a FOCIS 3 (or another recognized industry standard) compatible SC adapter, the fiber optic connector further including an outer housing axially movable relative to the inner housing and operably coupled to a strain relief boot such that the outer housing and the strain relief boot axially move together relative to the inner housing, the strain relief boot being disposed entirely rearward of the inner housing. In some examples, the inner housing includes one or more structural features of a standard SC connector inner housing, such as protruding catches and/or protruding stops. In some examples, the outer housing includes one or more structural features of a standard SC connector outer housing, such as a keying feature, and/or axial guides and windows that cooperate with the protruding catches and the protruding stops of the inner housing, as well as the latch arms of an adapter or other terminating device.

In accordance with further aspects of the present disclosure, a fiber optic connector includes an inner housing supporting a ferrule at a front end and having a forward portion adapted to operably mate with a FOCIS 5 (or another recognized industry standard) compatible MPO adapter, the fiber optic connector further including an outer housing axially movable relative to the inner housing and operably coupled to a strain relief boot such that the outer housing and the strain relief boot axially move together relative to the inner housing, the strain relief boot being entirely disposed rearward of the inner housing. In some examples, the outer housing is axially spring loaded. In some examples, the inner housing includes one or more structural features of a standard MPO connector inner housing. In some examples, the outer housing includes one or more structural features of a standard MPO connector outer housing.

In some examples of the connectors described herein, a flange extends radially from a rear portion of the strain relief boot, the flange being integral with the strain relief boot. In some examples, the flange includes an annular concave surface surrounding an axial bore of the strain relief boot and facing substantially away from the inner housing of the connector. In some examples, the flange is trumpet shaped and/or includes an annular convex surface surrounding an axial bore of the strain relief boot and facing substantially towards the inner housing of the connector.

In accordance with further aspects of the present disclosure, an assembly has a mated configuration and a non-mated configuration and includes a fiber optic socket having one or more flexible latch arms and a fiber optic connector having a forward portion that lockingly mates with the fiber optic socket in the mated configuration, the fiber optic connector having an inner housing supporting a ferrule at a front end, the fiber optic connector further including an outer housing axially movable relative to the inner housing and operably coupled to a strain relief boot disposed entirely rearwards of the inner housing such that the outer housing and the strain relief boot axially move together relative to the inner housing and such that in the mated configuration axial rearward movement of the strain relief boot causes flexion of the one or more latch arms. In some examples, the socket is a socket in a fiber optic adapter. In some examples, the socket is a socket in a standard SC fiber optic adapter.

In accordance with further aspects of the present disclosure, an assembly has a mated configuration and a non-mated configuration and includes a fiber optic socket having one or more locking features and a fiber optic connector having a forward portion that lockingly mates with resilient latch arms of the fiber optic socket in the mated configuration, the fiber optic connector having an inner housing supporting a ferrule at a front end, the fiber optic connector including an axially spring loaded outer housing axially movable relative to the inner housing and operably coupled to a strain relief boot disposed entirely rearwards of the inner housing such that the outer housing and the strain relief boot axially move together relative to the inner housing and such that in the mated configuration axial rearward movement of the strain relief boot causes disengagement of the resilient latch arms from notches in an outer surface of the inner housing. In some examples, the socket is a socket in a fiber optic adapter. In some examples, the socket is a socket in a standard MPO fiber optic adapter.

In accordance with further aspects of the present disclosure, an assembly has a mated configuration and a non-mated configuration and includes a fiber optic socket having one or more first locking features and a fiber optic connector having one or more second locking features, an inner housing supporting a ferrule, and a release mechanism that moves axially relative to the inner housing, wherein in the mated configuration a forward portion of the fiber optic connector including a forward portion of the release mechanism is housed in the fiber optic socket such that the one or more second locking features lockingly engages the one or more first locking features, and wherein the release mechanism is operably coupled to a strain relief boot disposed entirely rearward of the inner housing such that the release mechanism and the strain relief boot axially move together relative to the inner housing and such that in the mated configuration axial rearward movement of the strain relief boot causes disengagement of the one or more first locking features from the one or more second locking features.

In accordance with further aspects of the present disclosure, a fiber optic connector includes an inner housing; an outer housing surrounding the inner housing; and a strain relief boot; wherein the outer housing is movable relative to the inner housing and operably coupled to the strain relief boot such that the outer housing and the strain relief boot move together relative to the inner housing; and wherein the fiber optic connector is compliant with one or more TIA FOCIS 3 standards or another recognized industry standard.

In accordance with still further aspects of the present disclosure, a fiber optic connector includes an inner housing; an outer housing surrounding the inner housing; and a strain relief boot; wherein the outer housing is movable relative to the inner housing and operably coupled to the strain relief boot such that the outer housing and the strain relief boot move together relative to the inner housing; and wherein the fiber optic connector is compliant with one or more TIA FOCIS 5 standards or another recognized industry standard.

In some examples of the connectors and assemblies described herein, the strain relief boot is disposed rearward of the inner housing of the connector and has an axial length that is at least 25%, 50%, 75%, 100% as long (or greater) as an axial length of the inner housing defined between a front end and a back end of the inner housing.

In some examples of the connectors and assemblies described herein, a tapered axial region of the strain relief boot is radially narrower than at least one radial dimension of the outer housing.

In some examples of the connectors and assemblies described herein, a tapered axial region of the strain relief boot is radially narrower than all radial dimensions of the outer housing.

In some examples of the connectors and assemblies described herein, the tapered axial region of the strain relief boot is disposed forward of a flange that extends radially from a rear portion of the strain relief boot, the flange being integral with the strain relief boot, and rearward of a coupling region of the strain relief boot that operably couples the strain relief boot to the outer housing. In some examples, the flange includes an annular concave surface surrounding an axial bore of the strain relief boot and facing substantially away from the inner housing of the connector. In some examples, the flange includes an annular convex surface surrounding an axial bore of the strain relief boot and facing substantially towards the inner housing of the connector.

In some examples of the connectors and assemblies described herein, the strain relief boot defines a circumferentially closed axially extending bore that receives a fiber optic cable carrying one or more optical fibers. In some examples, an inner surface of the strain relief boot defines the axially extending bore, the inner surface being circumferentially continuous and uninterrupted.

In some examples of the connectors and assemblies described herein, the fiber optic connector includes a neck region that operably connects the outer housing to the strain relief boot, the neck region including a wall defining a hollow interior.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 4 is a top perspective view of a fiber optic connector in accordance with the present disclosure, including an optical cable.

FIG. 5 is a bottom perspective view of the fiber optic connector of FIG. 4.

FIG. 9 is an exploded view of the fiber optic connector of FIG. 4.

DETAILED DESCRIPTION

Figure 1:
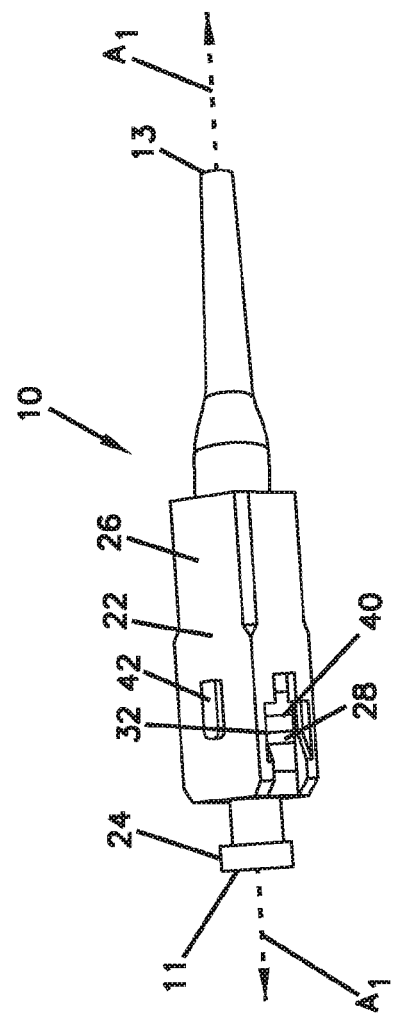
FIG. 1 is a perspective view of an example prior art SC connector.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
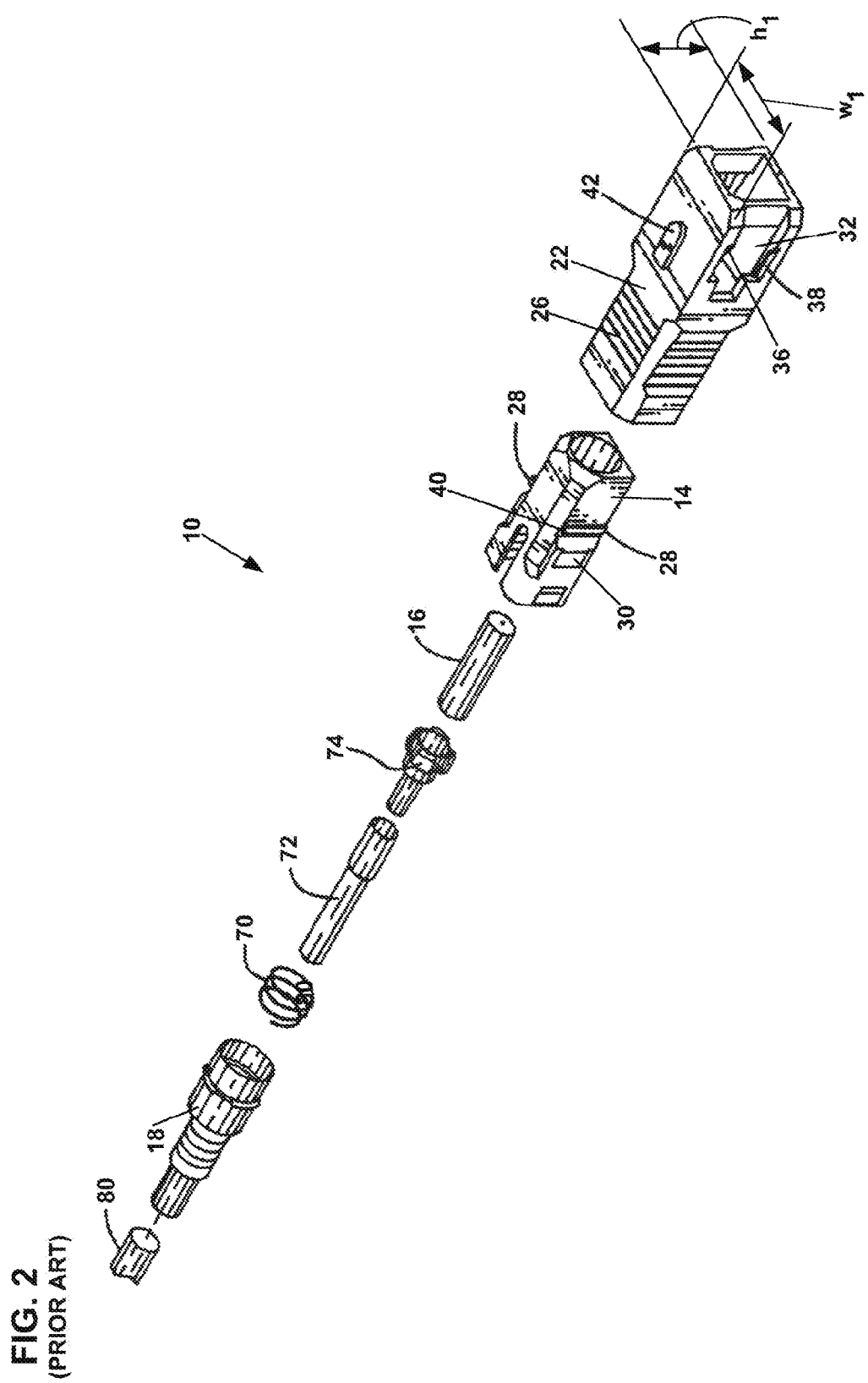
FIG. 2 is an exploded view of portions of the prior art SC connector of FIG. 1.

Referring to FIGS. 1-2, a prior art SC connector 10 axially extends along the axis $A_1$ between a front 11 and a back 13 of the connector 10. Generally, the SC connector 10 includes a plurality of discrete parts that are assembled together to form the connector 10. The parts include, e.g., an inner housing 14 supporting a spring loaded ferrule 16, a rear housing 18 adapted to frictionally mount a flexible strain relief boot 20, and an outer housing 22 positioned around the inner housing 14. The rear housing 18 is a separate component from the inner housing and the two are coupled together when assembling the connector 10. A removable dust cap 24 can be sleeved over the ferrule 16 to protect the ferrule 16 when the connector is not in use. The flexible strain relief boot 20 is not operably coupled to the outer housing 22, but rather is effectively affixed to the rear housing 18 and, thereby, the inner housing 14.

The outer housing 22 moves axially relative to the inner housing 14 (and also relative to the flexible strain relief boot 20) between forward most and rearward most positions. To axially move the outer housing 22 relative to the inner housing 14, a user can grasp the finger hold 26 toward the rear of the outer housing 22.

The inner housing 14 includes a protruding catch 28 on each of two opposing sides and a protruding stop 30 rearward of the catches 28 on each of the two opposing sides. Each of the pair of protruding catches 28 and the pair of protruding stops 30 partially extends into a window 32 on either side of the outer housing 22. The protruding catches 28 engage a forward portion of the frames of the window 32 when the outer housing 22 is in its rearward most position relative to the inner housing 14. The protruding stops 30 engage a rearward portion of the frames of the windows 32 when the outer housing 22 is in its forward most position relative to the inner housing 14.

A pair of axially extending guides 36, 38 above and below each window 32 on either side of the outer housing are adapted to engage flexible latch arms disposed in the socket of an adapter (not shown in FIGS. 1-2). As the connector 10 is axially pushed forwards into the adapter socket, the guides 36, 38, engage the flexible latch arms of the adapter and spread them apart until the protruding catches 28 clear the latch arms rearwardly. As the connector continues to push forward, the guides 36, 38 then release the latch arms, allowing the latch arms to snap over the rear of the protruding catches 28 and into the notch 40 immediately behind each of the protruding catches 28, which axially stabilizes or locks the connector 10 relative to the adapter.

To remove the connector 10 from the adapter, the outer housing 22 is pulled rearwards such that the guides 36 and 38 again engage the latch arms of the adapter and spread them apart (i.e., out of the notches 40) such that the latch arms can clear the protruding catches 28 forwardly and thereby release the connector 10. Thus, the technician must be able to reach the outer housing 22 in order to disengage the connector 10 from its adapter or other receptacle.

The guides 36, 38 are contoured with chamfers, peaks and troughs to provide for the latch arm engagement and disengagement described.

A keying feature 42 on the outer housing 22 can be adapted to mate with a complementary feature of the adapter to provide for coupling of connector and adapter in only one orientation.

Figure 3:
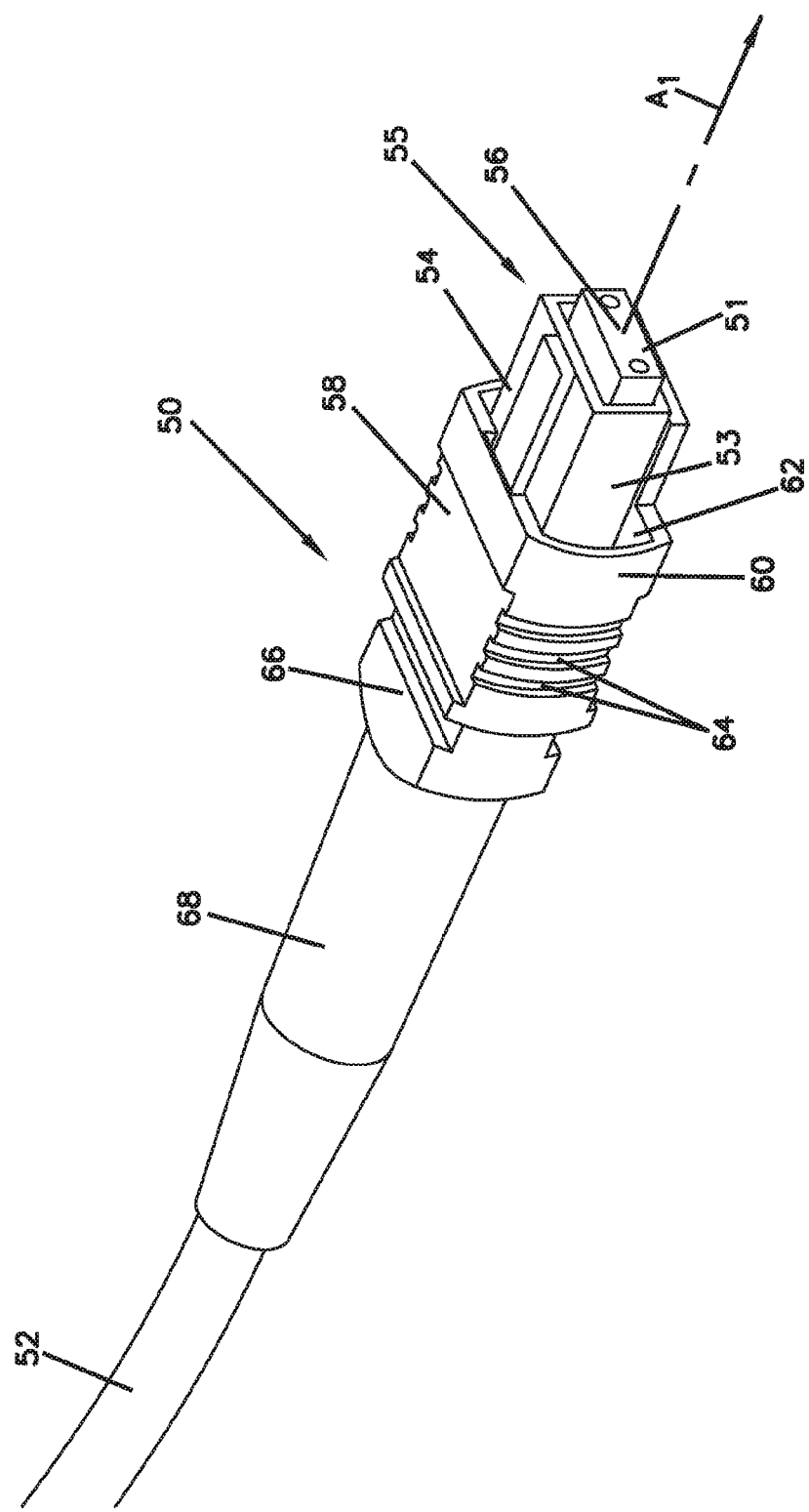
FIG. 3 is a perspective view of an example prior art MPO connector.
Figure 6:
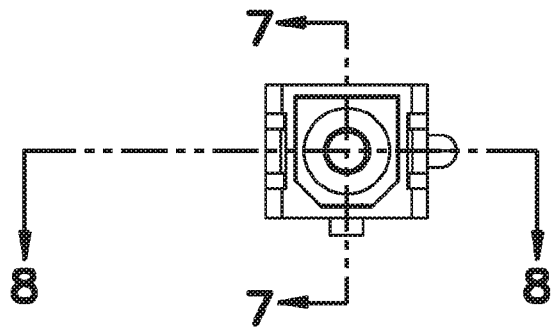
FIG. 6 is a front view of the fiber optic connector of FIG. 4.
Figure 7:
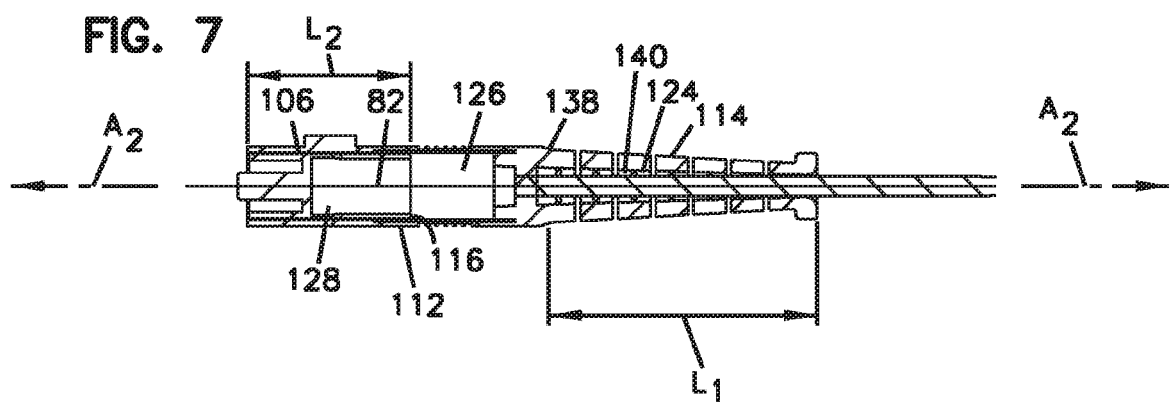
FIG. 7 is a cross-sectional view of the fiber optic connector of FIG. 4 along the line 7-7 of FIG. 6.
Figure 8:
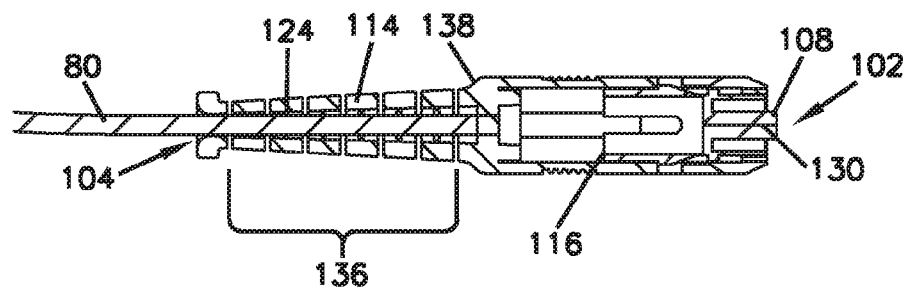
FIG. 8 is a further cross-sectional view of the fiber optic connector of FIG. 4 along the line 8-8 of FIG. 6.
Figure 10:
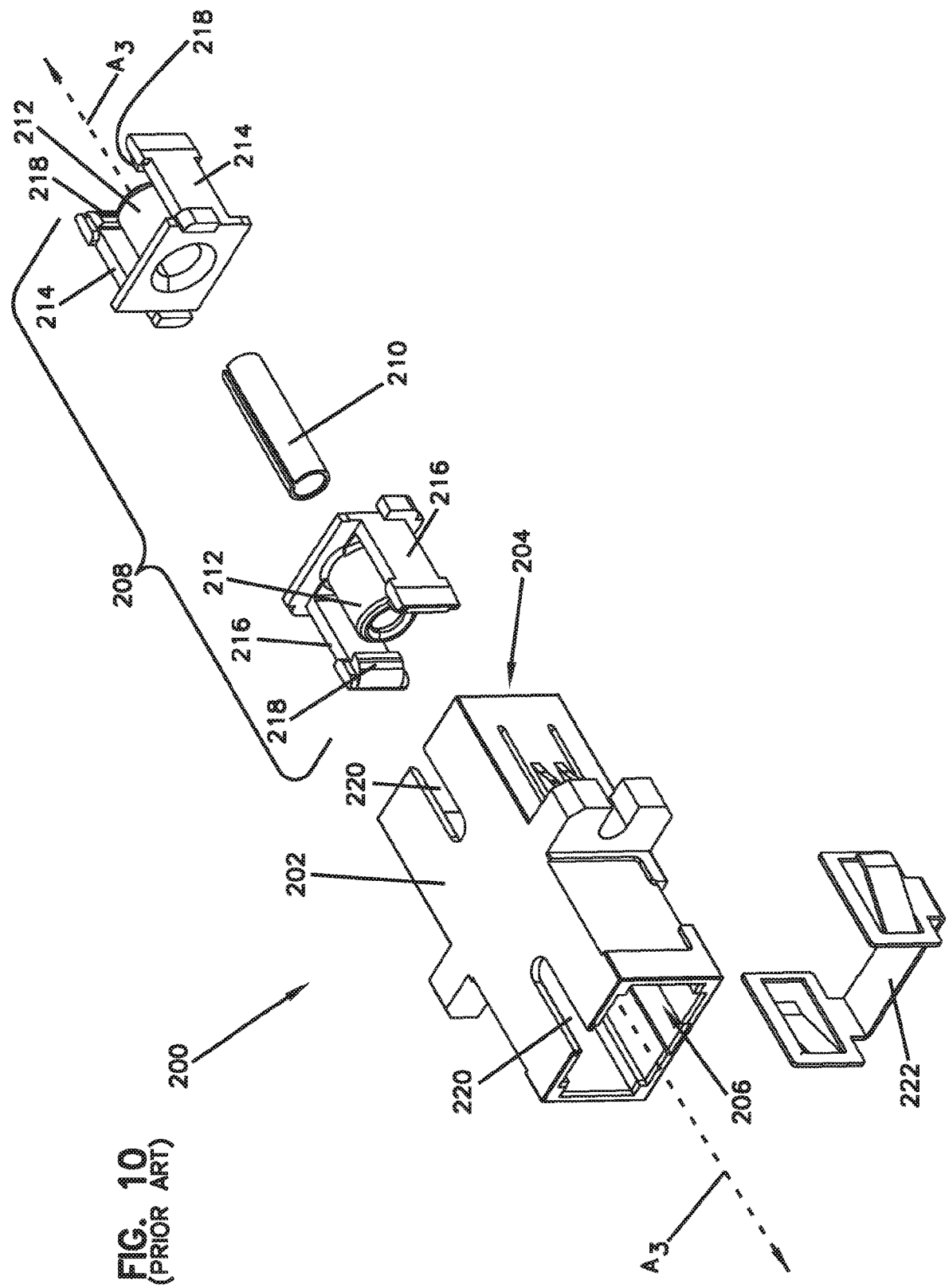
FIG. 10 is an exploded view of an example prior art SC adapter.
Figure 11:
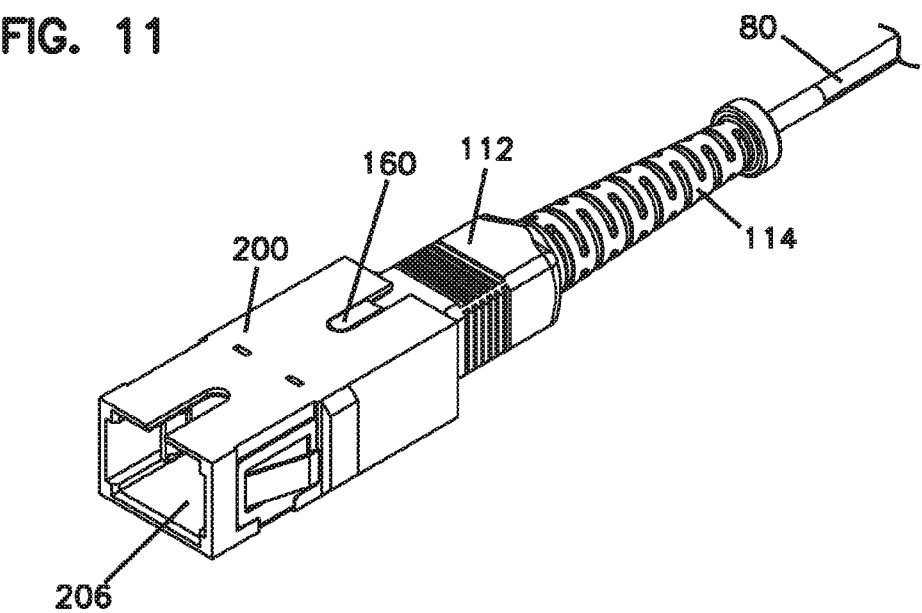
FIG. 11 is a perspective view of an assembly including the fiber optic connector of FIG. 4 and the adapter of FIG. 9, the fiber optic connector being in a mated configuration with the fiber optic adapter.
Figure 12:
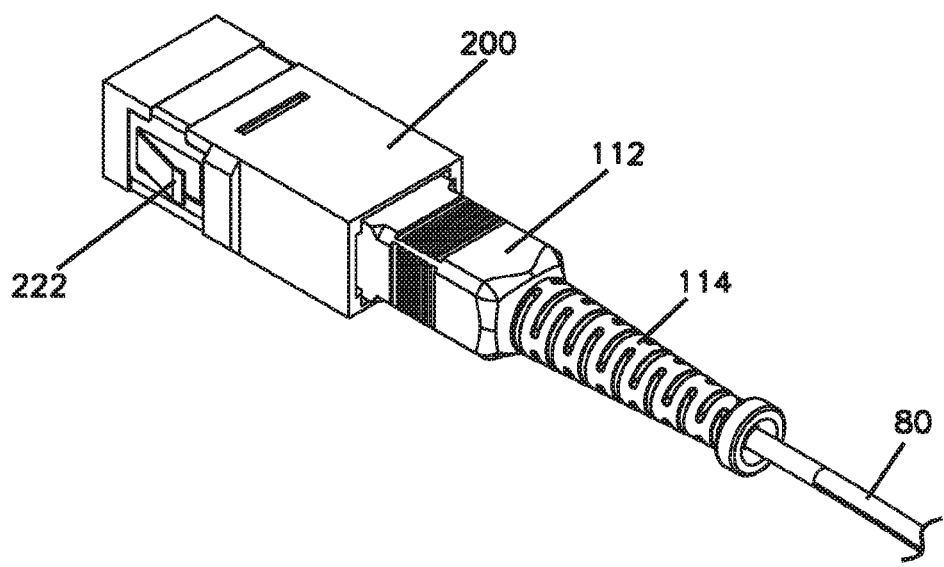
FIG. 12 is a further perspective view of the assembly of FIG. 10.
Figure 13:
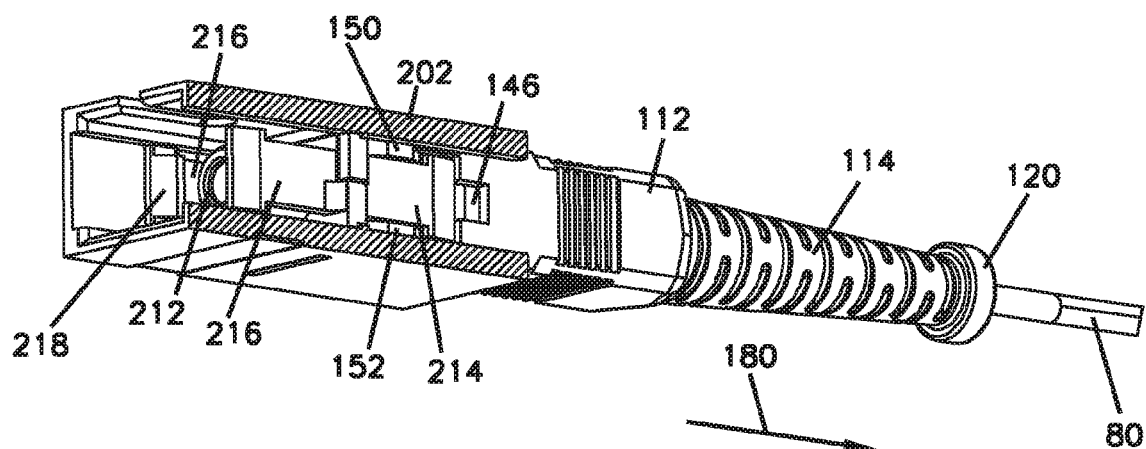
FIG. 13 is a further perspective view of the assembly of FIG. 10, with a portion of the adapter removed.
Figure 14:
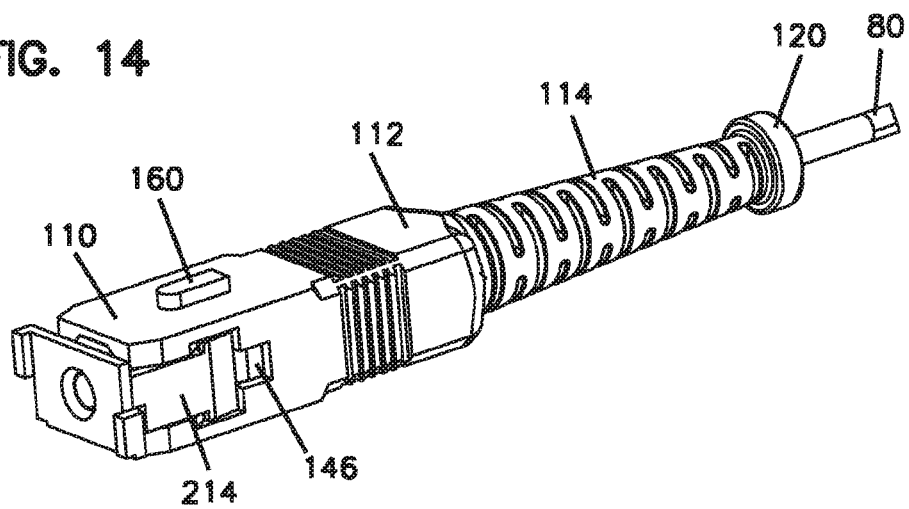
FIG. 14 is a perspective view of an assembly including the connector of FIG. 4 and a portion of the adapter of FIG. 9.

Referring now to FIG. 3, an example prior art MPO connector 50 terminates a multi-fiber cable 52. The connector 50 includes an inner housing 54 supporting a multi-fiber ferrule 56 and an outer housing 58 moveable relative to the inner housing against a spring that biases the outer housing 58 along the central axis $A_1$ of the connector 50 towards the front 51 of the connector 50. The ferrule 56 is also axially spring loaded.

Latch arms on opposing sides within an MPO adapter socket or other compatible termination device lockingly snap into notches on opposing sides 53 and 55 of the outer surface of the inner housing. When the outer housing 58 is in the relaxed or forward-most position as shown in FIG. 3, a forward portion 60 of the outer housing covers the notches. By axially sliding the outer housing 58 rearwards (i.e., against the spring bias) relative to the inner housing 54, the latch arms become uncovered by the outer housing 58. Further rearward pulling of the outer housing 58 causes the portions of the latch arms that engage the notches to ride up ramps at the front of the notches such that the latch arms disengage the notches, thereby releasing the MPO connector from the adapter or other termination device/receptacle.

A technician can grasp the outer housing 58 (e.g., at finger grips 64) and pull back to actuate this release mechanism. A rear protruding stop 66 on the inner housing 54 can stop the outer housing 58 from being pulled back too far, e.g., from being pulled rearward beyond the inner housing 54 or from damaging the spring that axially biases the outer housing. A strain relief boot 68 is attached at the rear of the inner housing 54. Thus, the outer housing 58 is not operably coupled to the strain relief boot 68 and moves independently of the strain relief boot 68.

Referring now to FIGS. 4-9, an example single fiber optical connector 100 in accordance with the present disclosure will be described that provides at least one advantage over the prior art connectors described above. The connector 100 terminates a cable 80 carrying an optical fiber 82. In some examples, the cable 80 is, e.g., a 900 micron cable carrying, e.g., a 250 micron coated optical fiber 82 that passes through the connector from the rear, the coated fiber alone entering the bore 130 of the ferrule 108.

The connector 100 is defined by a central longitudinal axis $A_2$ and extends longitudinally from a front 102 to a back 104.

The fiber optic connector 100 includes an inner housing 106 supporting a ferrule 108. A forward portion 110 of the connector 100 can be adapted to operably mate with a standard SC adapter. That is, the fiber optic connector 100 can be TIA FOCIS 3 (or another recognized industry standard) compatible. In addition, the inner housing 106 can be identical to the prior art SC connector inner housing 14 described above.

The fiber optic connector 100 further includes an outer housing 112 that houses the inner housing 106. The outer housing 112 is axially movable (i.e., along the axis $A_2$) relative to the inner housing 106 and operably coupled to a strain relief boot 114 such that the outer housing 112 and the strain relief boot 114 axially move (i.e., along the axis $A_2$) together relative to the inner housing 106.

The strain relief boot 114 extends rearwards beyond a rear end 116 of the inner housing. The strain relief boot 114 is adapted to provide bend radius protection to the cable 80 and the fiber 82 carried by the cable 80. The strain relief boot 114 can be resiliently flexed away from axial alignment with the axis $A_2$. Optionally, to provide or enhance its flexion capability, the strain relief boot 114 can include one or more grooves or apertures 118.

Optionally, a flange 120 extends radially from a rear portion of the strain relief boot 114, the flange 120 being integral with the strain relief boot 114. The flange includes an annular concave surface 122 surrounding the axial bore 124 of the strain relief boot and facing substantially away from the inner housing 106 of the connector 100. However, this surface need not be concave. The axial bore 124 of the strain relief boot is in communication with the inner volumes 126 and 128 defined by the outer housing 112 and the inner housing 106, respectively, as well as the fiber bore 130 of the ferrule 108.

Figure 15:
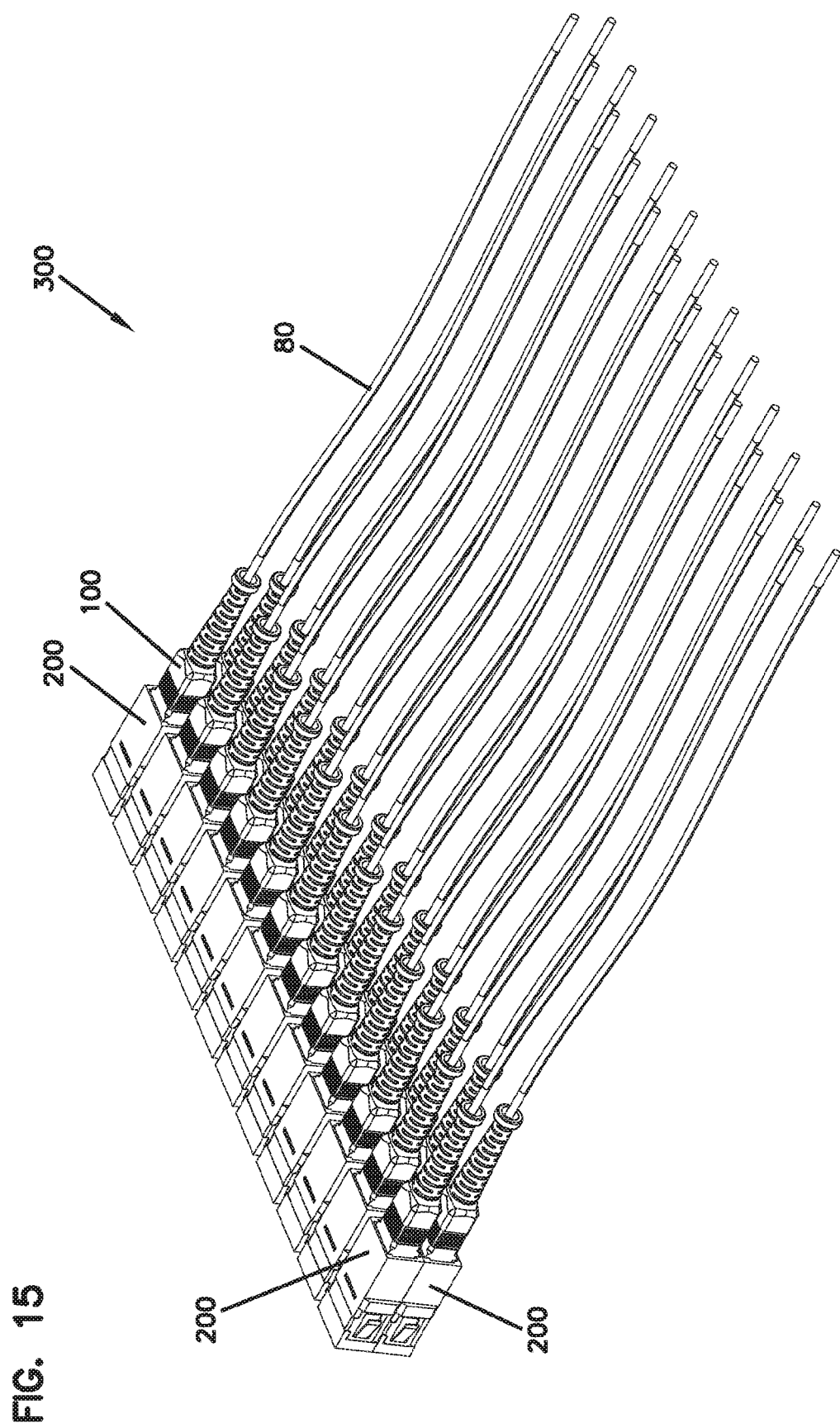
FIG. 15 is a perspective view of a distribution array of a plurality of the assemblies of FIG. 10.
Figure 16:
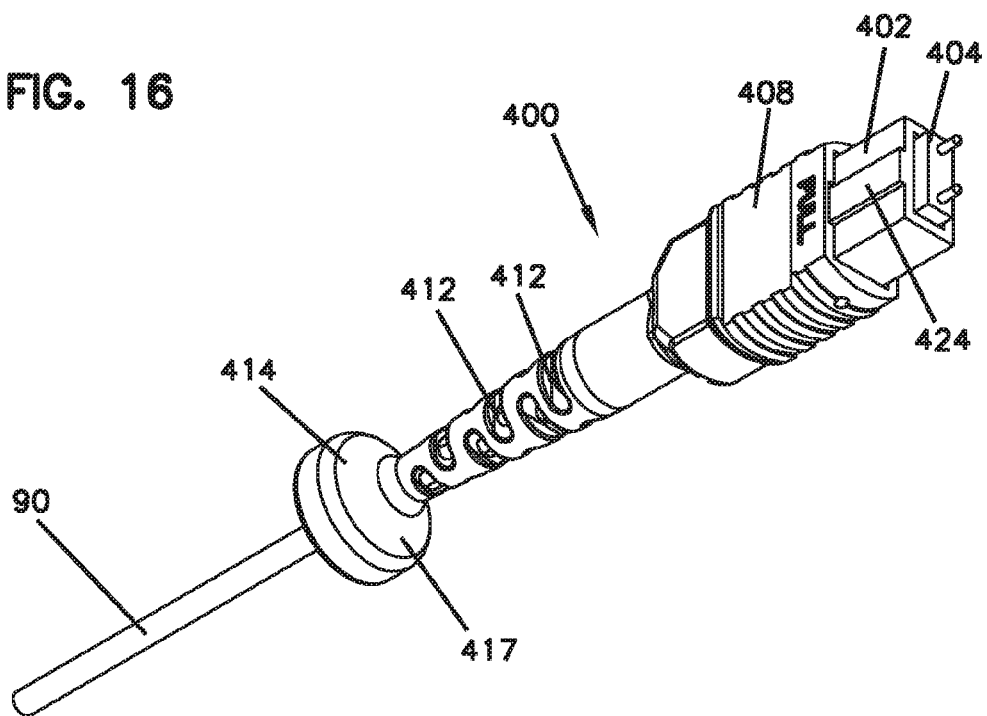
FIG. 16 is a top perspective view of a further fiber optic connector in accordance with the present disclosure, including a fiber optic cable.
Figure 17:
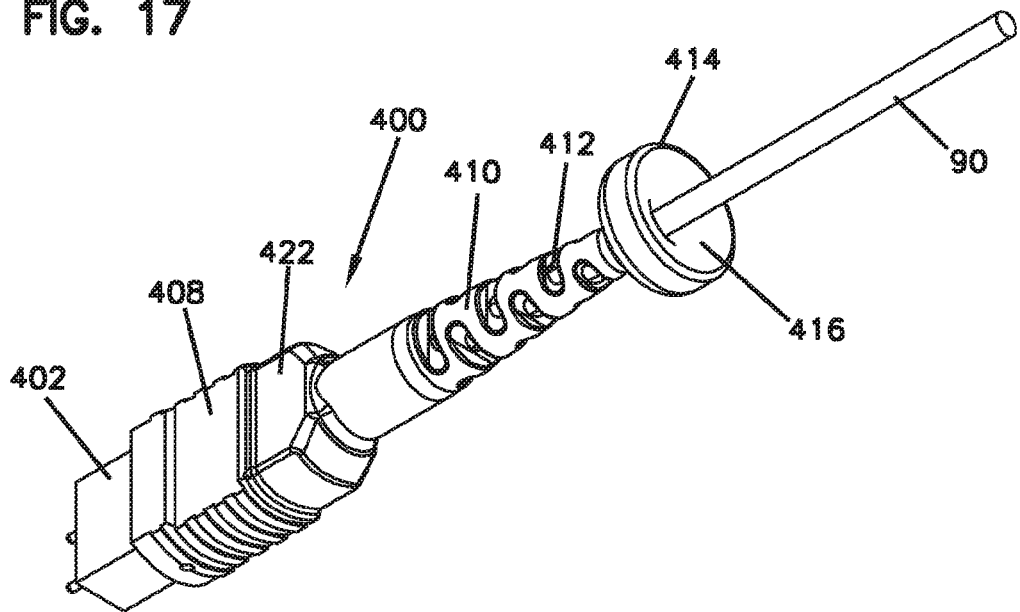
FIG. 17 is a bottom perspective view of the fiber optic connector of FIG. 15.
Figure 18:
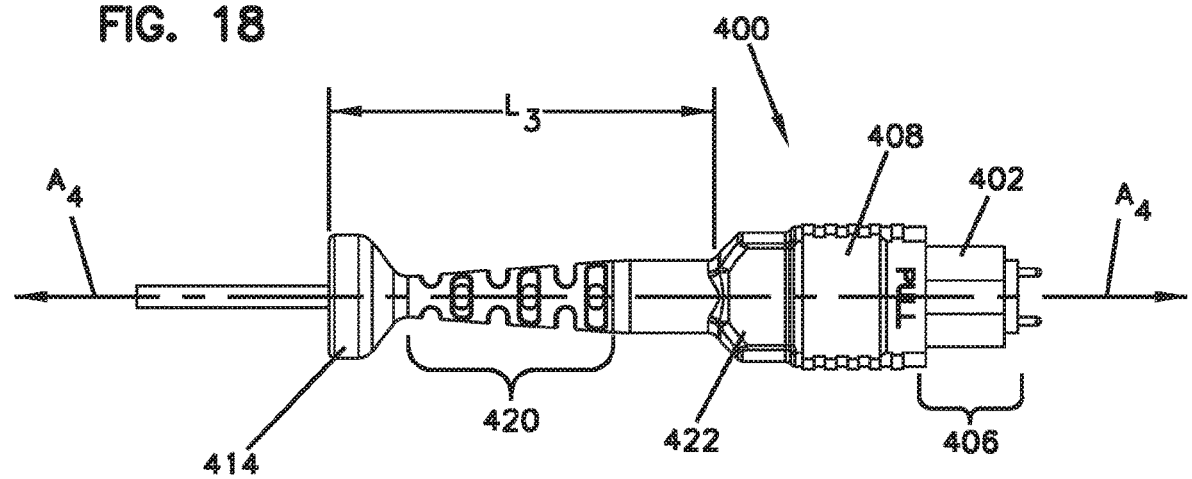
FIG. 18 is a top view of the fiber optic connector of FIG. 15.
Figure 19:
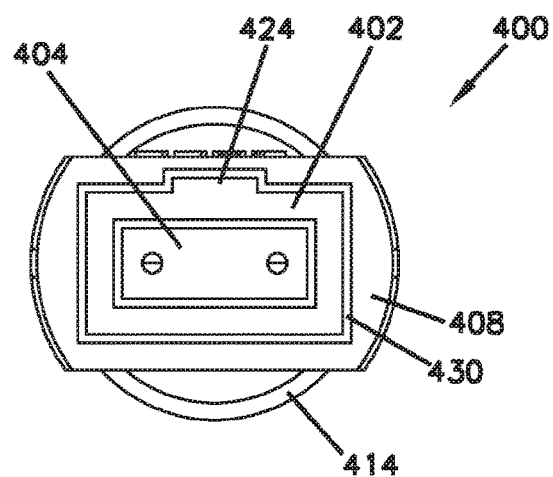
FIG. 19 is a front view of the fiber optic connector of FIG. 15.

The flange 120 can be, but need not be, made integrally with the rest of the strain relief boot 114 and can serve as a finger hold for more easily grasping the strain relief boot 114 when releasing the connector 100 from an adapter or other termination device. The axial distance of the flange 120 from the portion 110 of the connector 100 that is inserted in the adapter or other termination device, combined with the inherent flexibility of the strain relief boot, can facilitate grasping and removing of a given connector 100, particularly from a high density panel or area of connectors, such as the high density array 300 of adapters 200 and connectors 100 shown in FIG. 15.

The flange 120 can also provide additional strain relief to the cable 80, particularly from lateral loads.

The strain relief boot 114 is disposed entirely rearward of the inner housing 106 and has a length $L_1$ that is at least 25%, 50%, 75%, 100% as long (or greater) as an axial length $L_2$ of the inner housing.

The strain relief boot 114 can include a tapered region 136 that radially narrows from front to back and is radially narrower at all points than at least one or all radial dimensions of the outer housing 112. The tapered region 136 is disposed forward of the flange 120.

In axial regions between adjacent apertures 118, the inner surface 140 of the strain relief boot 112 defines portions of the circumferentially closed axially extending bore 124 that receives the fiber optic cable 80. In one or more of the axial regions between adjacent apertures 118, the inner surface 140 is circumferentially continuous and uninterrupted around the axis $A_2$.

Optionally, a neck region 142 (which can taper axially) operably connects the outer housing 112 to the strain relief boot 114.

The inner housing 106 includes a protruding catch 144 on each of two opposing sides and a protruding stop 146 rearward of the catches 144 on each of the two opposing sides. Each of the pair of protruding catches 144 and the pair of protruding stops 146 partially extends into a window 148 on either side of the outer housing 112. The protruding catches 144 engage a forward portion of the frames of the windows 148 when the outer housing 112 is in its rearward most position relative to the inner housing 106. The protruding stops 146 engage a rearward portion of the frames of the windows 148 when the outer housing 112 is in its forward most position relative to the inner housing 106.

A pair of axially extending guides 150, 152 above and below each window 148 on either side of the outer housing are adapted to engage flexible latch arms disposed in the socket of an adapter (not shown in FIGS. 1-2).

The guides 150, 152 are contoured with chamfers, peaks and troughs to provide for the adapter latch arm engagement and disengagement described below.

A keying feature 160 on the outer housing 112 can be adapted to mate with a complementary feature of the adapter to provide for coupling of connector and adapter in only one orientation.

Referring now to FIGS. 4-14, the prior art SC adapter 200 (FIG. 10) and the connector 100 of FIGS. 4-9 are compatible with each other as shown in FIGS. 11-14.

The adapter 200 includes a main housing 202 defining first and second connector sockets 204 and 206 each adapted to receive the forward portion 110 of a connector 100.

Within the main housing 202 is held a ferrule alignment mechanism 208 including a ferrule alignment sleeve 210 and ferrule alignment sleeve housings 212 for receiving the ferrules 108 of two connectors 100 and axially aligning and optically coupling them.

The ferrule alignment mechanism 208 includes pairs of latch arms 214 and 216 extending parallel to the axis $A_3$ of the adapter 200 and adapted to engage the protruding catches 144 of the connector inner housing. The latch arms 214 and 216 are positioned relative to their corresponding alignment sleeve housing 212 such that projections 218 (projecting toward the axis $A_3$) on the latch arms 214, 216 will slide and then latch over the protruding catches 144 of the inner housing of the connector 100 when the connector 100 is properly inserted in the adapter socket and the ferrule properly inserted in the alignment sleeve 212. The latch arms 214, 216 can be resiliently flexed outward (i.e., away from the axis $A_3$) when, e.g., pushed outward by the guides 150, 152 of the connector 100 as the outer housing 112 or the strain relief boot 114 of the connector 100 is pulled rearwards (i.e., in the direction of the arrow 180 in FIG. 13).

The surfaces of the projections 218 can be rounded or chamfered to assist in guiding the projections to their latching position rearward of the protruding catches 144 of the connector 100.

The main housing 202 can include a keying slot 220 adapted to receive the keying feature 160 of the connector 100. The main housing 202 can also include a removable coupler 222 having flexible coupling arms for coupling the adapter 200 to distribution equipment, such as a patch panel.

During connector installation, as the connector 100 is axially pushed forwards (i.e., opposite the direction of the arrow 180) into the connector socket 204, the guides 150, 152, engage the flexible latch arms 214 of the adapter 200 and spread them apart until the protruding catches 144 clear the latch arms rearwardly. As the connector continues to push forward, the guides 150, 152 then release the latch arms, allowing the latch arms to snap over the rear of the protruding catches 144 and into the notches 145 immediately behind each of the protruding catches 144, which axially stabilizes or locks the connector 100 relative to the adapter 200.

To remove the connector 100 from the adapter 200, the strain relief boot 114 is pulled rearwards (in the direction of the arrow 180) such that the guides 150 and 152 again engage the latch arms 214 of the adapter and spread them apart (i.e., out of the notches 145) causing the latch arms to clear the protruding catches 144 forwardly and thereby release the connector 100. The technician can grasp any portion of the strain relief boot or the outer housing 112 to release the connector 100 from the adapter 200.

Referring now to FIGS. 16-19, an example multi-fiber optical connector 400 in accordance with the present disclosure will be described. The connector 400 can be adapted to be compatible with a standard TIA FOCIS 5 (or another recognized industry standard) adapter or other connector termination device.

The connector 400 is defined by a longitudinal axis $A_4$ and terminates a multi-fiber optical cable 90, e.g., a ribbon cable. The connector 400 includes an inner housing 402 supporting a multi-fiber ferrule 404 at a front end, the ferrule 404 defining a plurality of axially extending fiber holes. A spring within the inner housing 402 axially biases the ferrule 404 forwards. A forward portion 406 of the connector 400 is adapted to operably mate with a standard MPO adapter (described below in connection with FIGS. 20-24).

The connector 400 further includes an outer housing 408 surrounding the inner housing 402 and axially movable relative to the inner housing 402. The outer housing 408 can be axially spring loaded, the spring biasing the outer housing forwards.

The outer housing 408 is operably coupled to a strain relief boot 410 such that the outer housing 408 and the strain relief boot 410 axially move together relative to the inner housing 402.

The strain relief boot 410 is disposed entirely rearward of both the inner housing 402 and the outer housing 408. The strain relief boot 410 is adapted to provide bend radius protection to the cable 90 and the fibers carried by the cable 90. Thus, the strain relief boot 410 can be resiliently flexed away from axial alignment with the axis $A_4$. Optionally, to provide or enhance its flexion capability, the strain relief boot 410 can include one or more grooves or apertures 412.

Optionally, a flange 414 extends radially from a rear portion of the strain relief boot 410, the flange 414 being integral with the strain relief boot 410. The flange includes an annular concave surface 416 surrounding the axial bore of the strain relief boot and facing substantially away from the inner housing 402 of the connector 400. However, this surface need not be concave. In addition, the flange can include an annular convex outer surface 417.

The flange 414 can serve as a finger hold for more easily grasping the strain relief boot 410 when releasing the connector 400 from an adapter or other termination device. The axial distance of the flange 414 from the portion 406 of the connector 400 that is inserted in the adapter or other termination device, combined with the inherent flexibility of the strain relief boot 410, can facilitate grasping and removing of a given connector 400, particularly from a high density array of connectors.

The flange 414 can also provide additional strain relief to the cable 90, particularly from lateral loads.

The strain relief boot 410 is disposed entirely rearward of the inner housing 402 and has a length $L_3$ that is at least 25%, 50%, 75%, or 100% as long (or greater) as an axial length of the inner housing 402.

The strain relief boot 410 can include a tapered region 420 that radially narrows from front to back and is radially narrower at all points than at least one or all radial dimensions of the outer housing 408. The tapered region 420 is disposed forwards of the flange 414.

In one or more axial regions between adjacent apertures 412, the inner surface of the strain relief boot 410 is circumferentially continuous and uninterrupted around the axis $A_4$.

Optionally, a neck region 422 (which can taper axially) operably connects the outer housing 408 to the strain relief boot 410.

Optionally, a keying feature 424 on the inner housing 402 provides for insertion into an adapter or other termination device in the proper orientation.

A gap 430 between the inner housing 402 and the outer housing 408 is adapted to receive the free ends of the latch arms of an adapter or other termination device, as described below.

Figure 20:
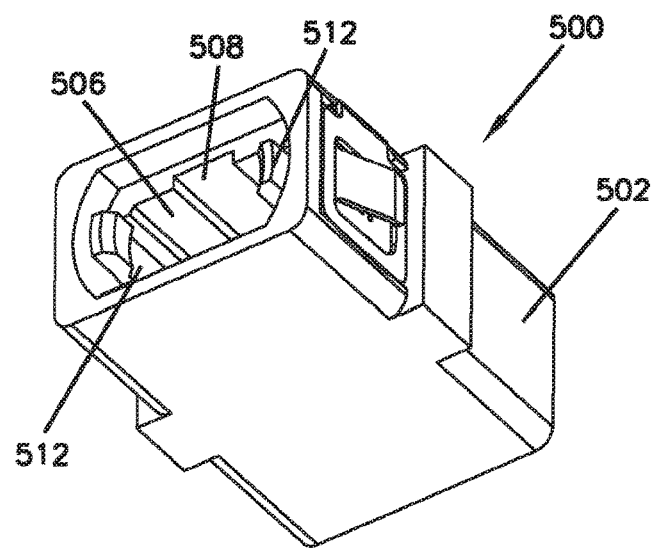
FIG. 20 is a perspective view of an example adapter that is compatible with the connector of FIG. 16.
Figure 21:
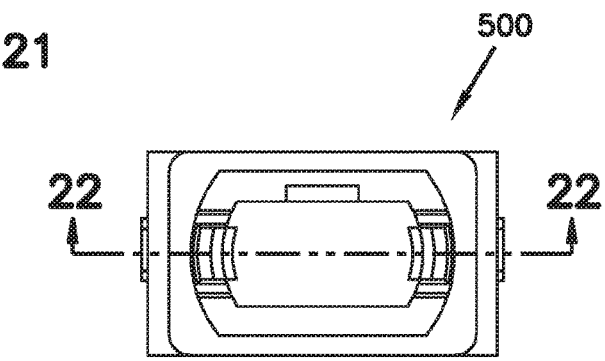
FIG. 21 is a front view of the adapter of FIG. 19.
Figure 22:
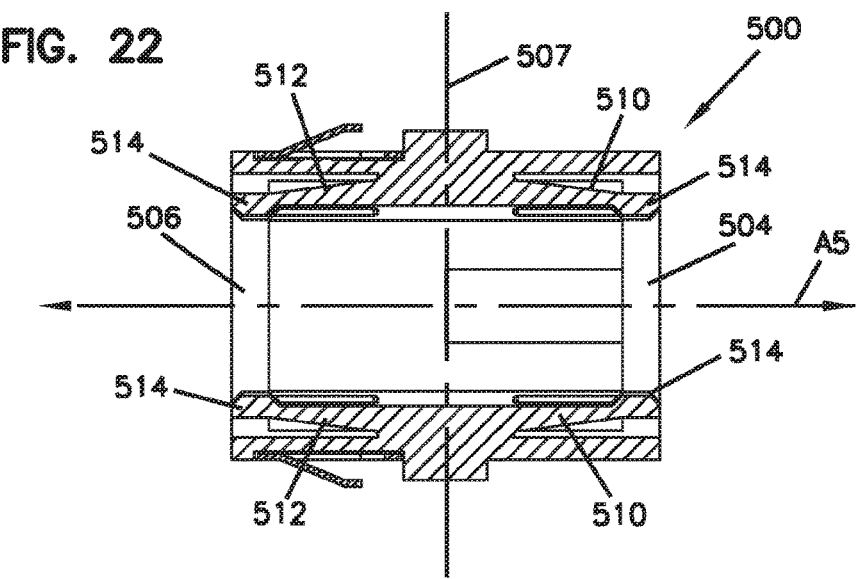
FIG. 22 is a cross-sectional view of the adapter of FIG. 19 along the line 22-22 in FIG. 21.
Figure 23:
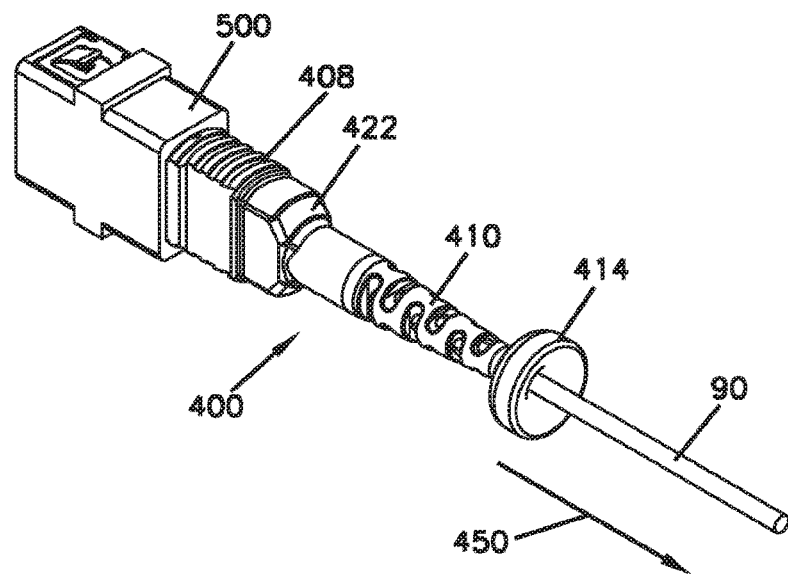
FIG. 23 is a perspective view of an example assembly including the fiber optic connector of FIG. 15 and the adapter of FIG. 19, the fiber optic connector being in a mated configuration with the fiber optic adapter.
Figure 24:
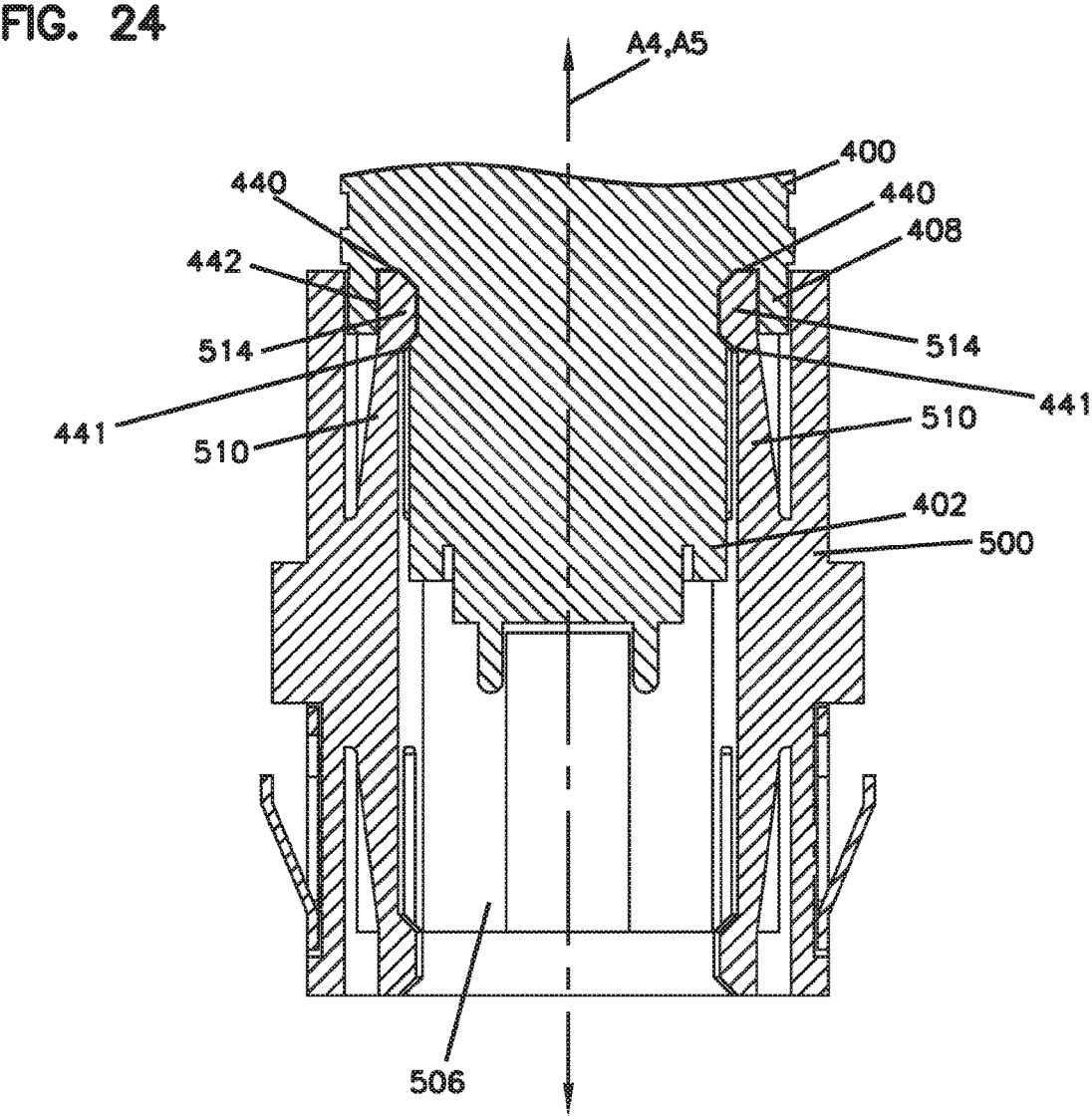
FIG. 24 is a schematic cross-sectional view of a portion of the assembly of FIG. 22.

Referring now to FIGS. 20-22, an example multi-fiber connector adapter 500 is defined by a longitudinal axis $A_5$ and includes a housing 502 having opposing first and second sockets 504 and 506 to receive and optically couple first and second connectors at an optical coupling plane 507, such as male and female versions of the connectors 400.

A keying groove 508 can be adapted to receive the corresponding keying feature of the connector.

Each of the sockets 504 and 506 includes a pair of opposing latch arms 510, 512, each of the latch arms including a projection 514 at its free end that projects towards the axis $A_5$.

Referring now to FIGS. 23-34, when, inserting the connector 400 into the adapter 500, the connector 400 is translated forwards (opposite the direction of the arrow 450 in FIG. 23) into the socket of the adapter. In doing so, the projections 514 of the latch arms 510 snap into notches 440 on either side of the inner housing 402, the rearward portions of the latch arms being covered by the inner wall 442 of the outer housing 408.

By pulling on the strain relief boot 410 (including the flange 414) rearwards (i.e., in the direction of the arrow 450 in FIG. 23), the inner wall 442 of the outer housing 408 uncovers the latch arms 510. Further rearward pulling of the strain relief boot 410 causes the projections 514 to ride up ramps 441 at the forward ends of the notches 440 such that the latch arms 510 disengage the notches 440, thereby releasing the connector 400 from the adapter 500 or other termination device/receptacle.

The technician can grasp any portion of the strain relief boot 410, the neck region 422, or the outer housing 408 to release the connector 400 from the adapter 500.

Although in the foregoing description, terms such as "front," "forwards," "back"/"rear," etc., were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic connector assembly, the assembly having a mated configuration and a non-mated configuration, comprising:
   a socket including one or more first locking features; and
   a fiber optic connector having a longitudinal axis extending from a front to a back of the connector, the connector including one or more second locking features, an inner housing supporting a ferrule, an outer housing that moves axially relative to the inner housing, and a strain relief boot;
   wherein in the mated configuration a forward portion of the outer housing is housed in the fiber optic socket such that the one or more second locking features lockingly engage the one or more first locking features;
   wherein the outer housing is operably coupled to the strain relief boot such that the outer housing and the strain relief boot axially move together relative to the inner housing and such that in the mated configuration axial rearward movement of the strain relief boot causes disengagement of the one or more first locking features from the one or more second locking features; and
   wherein in the mated configuration axial rearward movement of the strain relief boot causes the outer housing to engage and spread apart a pair of resilient latch arms.

2. The fiber optic connector assembly of claim 1, wherein the strain relief boot is disposed entirely rearward of the inner housing.

3. The fiber optic connector assembly of claim 1, wherein the one or more second locking features include a pair of catches protruding from opposing sides of the inner housing of the fiber optic connector.

4. The fiber optic connector assembly of claim 1, wherein the one or more first locking features include projections defined by the pair of resilient latch arms, the projections projecting towards the longitudinal axis when the assembly is in the mated configuration.

5. The fiber optic connector assembly of claim 1, wherein the fiber optic connector is compliant with all TIA FOCIS 3 standards.

6. The fiber optic connector assembly of claim 1, wherein the fiber optic connector further includes a flange extending radially away from the longitudinal axis, the flange extending from a rear portion of the strain relief boot.

7. The fiber optic connector assembly of claim 6, wherein the flange includes an annular concave surface facing substantially away from the inner housing.

8. The fiber optic connector assembly of claim 6, wherein a radial diameter of the flange perpendicular to the longitudinal axis is the largest radial diameter of the strain relief boot.

9. The fiber optic connector assembly of claim 8, wherein the radial diameter of the flange is at least twice as large as a radial diameter of the strain relief boot at a front end of the strain relief boot.

10. The fiber optic connector assembly of claim 1, wherein a neck region of the connector connects the outer housing to the strain relief boot, the neck region being radially larger than a radial dimension of the strain relief boot at a front end of the strain relief boot.

11. The fiber optic connector assembly of claim 1, wherein the outer housing and the strain relief boot are portions of an integral single-piece release mechanism.

12. The fiber optic connector assembly of claim 1, wherein the strain relief boot is disposed entirely rearward of the inner housing, and wherein an axial length of the strain relief boot is at least as long as an axial length of the inner housing.

13. The fiber optic connector assembly of claim 1, wherein at least a portion of an inner wall of the strain relief boot circumferentially surrounds the longitudinal axis, the portion of the inner wall being circumferentially uninterrupted.

14. The fiber optic connector assembly of claim 1, wherein the socket is a socket in a fiber optic adapter.

15. The fiber optic connector assembly of claim 1, wherein a tapered axial region of the strain relief boot is radially narrower than at least one radial dimension of the outer housing.

16. The fiber optic connector assembly of claim 15, wherein the tapered axial region of the strain relief boot is radially narrower than all radial dimensions of the outer housing.

17. The fiber optic connector assembly of claim 1, wherein the strain relief boot is adapted to be flexed away from the longitudinal axis of the connector within the inner housing.

18. The fiber optic connector assembly of claim 1, wherein the outer housing is axially spring loaded.

19. A fiber optic connector assembly, the assembly having a mated configuration and a non-mated configuration, comprising:
   a socket including first locking features; and
   a fiber optic connector having a longitudinal axis extending from a front to a back of the connector, the connector including second locking features, an inner housing supporting a ferrule, an outer housing that moves axially relative to the inner housing, and a strain relief boot;
   wherein in the mated configuration a forward portion of the outer housing is housed in the fiber optic socket such that the second locking features lockingly engage the first locking features;
   wherein the outer housing is operably coupled to the strain relief boot such that the outer housing and the strain relief boot axially move together relative to the inner housing; and
   wherein in the mated configuration axial rearward movement of the strain relief boot causes the outer housing to engage and flex resilient latch arms disposed in the socket to disengage the first locking features from the second locking features.

20. The fiber optic connector assembly of claim 19,
wherein the first locking features include projections defined by the resilient latch arms; and
wherein the second locking features include catches protruding from opposing sides of the inner housing and notches positioned rearward of the catches, the notches being configured to receive the projections when the assembly is in the mated configuration.

21. The fiber optic connector assembly of claim 19, wherein in the mated configuration axial rearward movement of the strain relief boot causes the outer housing to spread apart the resilient latch arms disposed in the socket to disengage the first locking features from the second locking features.

22. A fiber optic connector assembly, the assembly having a mated configuration and a non-mated configuration, comprising:
a socket including one or more first locking features; and
a fiber optic connector having a longitudinal axis extending from a front to a back of the connector, the connector including one or more second locking features, an inner housing supporting a ferrule, an outer housing that moves axially relative to the inner housing, and a strain relief boot;
wherein in the mated configuration a forward portion of the outer housing is housed in the fiber optic socket such that the one or more second locking features lockingly engage the one or more first locking features;
wherein the outer housing is operably coupled to the strain relief boot such that the outer housing and the strain relief boot axially move together relative to the inner housing;
wherein in the mated configuration axial rearward movement of the strain relief boot causes the outer housing to engage and flex resilient latch arms disposed in the socket to disengage the first locking features from the second locking features;
wherein the strain relief boot is disposed entirely rearward of the inner housing;
wherein the fiber optic connector further includes a flange extending radially away from the longitudinal axis, the flange extending from a rear portion of the strain relief boot;
wherein the outer housing and the strain relief boot are portions of an integral single-piece release mechanism; and
wherein the strain relief boot is adapted to be flexed away from the longitudinal axis.

23. The fiber optic connector assembly of claim 22, wherein the outer housing is axially spring loaded.

24. The fiber optic connector assembly of claim 22,
wherein the first locking features include projections defined by the resilient latch arms; and
wherein the second locking features include catches protruding from opposing sides of the inner housing and notches positioned rearward of the catches, the notches being configured to receive the projections when the assembly is in the mated configuration.

25. The fiber optic connector assembly of claim 22, wherein in the mated configuration axial rearward movement of the strain relief boot causes the outer housing to spread apart the resilient latch arms disposed in the socket to disengage the first locking features from the second locking features.

* * * * *

UNITED STATES PATENT AND TRADEMARK OFFICE
CERTIFICATE OF CORRECTION

PATENT NO. : 11,327,240 B2
APPLICATION NO. : 16/647450
DATED : May 10, 2022
INVENTOR(S) : David Jan Irma Van Baelen It is certified that error appears in the above-identified patent and that said Letters Patent is hereby corrected as shown below:

In the Specification

Column 1, Line 11: "which incorporated" should read --which are incorporated--

In the Claims

Column 13, Line 27, Claim 1: "a socket" should read --a fiber optic socket--

Column 14, Line 33, Claim 14: "the socket" should read --the fiber optic socket--

Column 14, Line 51, Claim 19: "a socket" should read --a fiber optic socket--

Column 15, Line 2, Claim 19: "socket to disengage" should read --fiber optic socket to disengage--

Column 15, Line 14, Claim 21: "the socket" should read --the fiber optic socket--

Column 15, Line 20, Claim 22: "a socket" should read --a fiber optic socket--

Column 16, Line 4, Claim 22: "socket to disengage" should read --fiber optic socket to disengage--

Column 16, Line 31, Claim 25: "the socket" should read --the fiber optic socket--

Signed and Sealed this
Ninth Day of August, 2022

Katherine Kelly Vidal
*Director of the United States Patent and Trademark Office*